Patented Sept. 10, 1935

2,014,353

UNITED STATES PATENT OFFICE 2,014,353

METHOD OF PREPARING THIURAM DISULPHIDES

Howard I. Cramer, Cuyahoga Falls, Ohio, assignor to Wingfoot Corporation, Wilmington, Del., a corporation of Delaware No Drawing. Application December 11, 1931, Serial No. 580,498

13 Claims. (Cl. 260—16)

This invention pertains to the preparation of thiuram disulphides.

In the manufacture of thiuram disulphides, particularly those employed in rubber vulcanization, difficulties have heretofore been experienced in obtaining the desired compounds at a reasonable cost, partly because of the formation of unwanted by-products in the course of the reaction. These disulphides, of which tetramethyl thiuram disulphide is an example, are customarily prepared through the oxidation of the corresponding dithiocarbamate salt by means of oxidizing agents, such, for example, as the halogens, nitric acid, and hydrogen peroxide. By this treatment, the salt-forming group, as the case may be, is removed from the sulfur of the radical, effecting a linkage between the sulfur atoms of two adjacent molecules.

These methods have, however, serious disadvantages. For instance, the utilization of the halogens as oxidizing agents is more or less unsatisfactory either because of the cost, as in the case of iodine, or because of undesirable side reactions which sometimes occur when bromine and chlorine are used. Nitric acid is of limited applicability; it cannot be used, for example, in the oxidation of dithiocarbamates because of the fact that it liberates unstable compounds which are understood to be dithiocarbamic acids. The use of hydrogen peroxide is similarly limited owing to the fact that its use is restricted to neutral or acid solutions.

An object of my invention, therefore, is to provide a simple and inexpensive method of oxidizing dithiocarbamate compounds.

I have discovered that ammonium and alkali metal salts of dithiocarbamates may be readily and effectively oxidized to the corresponding disulphides by the use of ammonium persulphate. The preferred method resides in the treatment of the dithiocarbamate salt with the theoretical quantity of ammonium persulphate in an aqueous medium.

A feasible method of preparing tetramethyl thiuram disulphide in accordance with my invention is outlined below.

Preferably, 90 parts of dimethyl amine are dissolved in water to form a solution of 8-10% concentration, to which solution are then added 150 parts of carbon disulphide and 85 parts of a 20% solution of sodium hydroxide in water. The product, sodium dimethyl dithiocarbamate in solution, is then oxidized to thiuram disulphide by the addition of 240 parts of ammonium persulphate in 20% water solution. Tetramethyl thiuram disulphide precipitates and, after separating (as by filtering or decanting), washing with water, and drying, is obtained as a white powder having a melting point of from 143 to 145 degrees C. The yield is about 95% of the theoretical amount and the product is of very high purity.

Analogous methods may obviously be followed in the manufacture of other thiuram disulphides by the oxidation of the corresponding ammonium or alkali metal dithiocarbamates.

The following are examples of other disulphides, prepared in accordance with my invention:

| Compound | Yield % | M. P.° C. |
|---|---|---|
| Tetraethyl thiuram disulphide | 97.5 | 73° |
| Tetrabutyl thiuram disulphide | 95.3 | Oil |
| Tetrabenzyl thiuram disulphide | 98.5 | 132-3° |
| Tetra(beta phenyl ethyl) thiuram disulphide | 90.0 | Oil |
| Tetramethyl thiuram disulphide | | |
| Tetra cyclohexyl thiuram disulphide | 70.0 | 113° |
| Di-piperidyl thiuram disulphide | 96.5 | 130-1° |
| Di-benzyl thiuram disulphide | 71.0 | 67-72° |
| Di(beta phenyl ethyl) thiuram disulphide | 94.8 | 83-84.5° |
| Diethyl dicyclohexyl thiuram disulphide | 75.0 | 117-8° |
| Tetra amyl thiuram disulphide | 98.0 | Oil |
| Dimethyl dicyclohexyl thiuram disulphide | 90.0 | |
| Dialpha methyl piperidyl thiuram disulphide | 96.8 | |
| Digamma methyl piperidyl thiuram disulphide | 98.3 | |

The ammonium, sodium, potassium and lithium salts of the dithiocarbamate may be employed although in practice the use of the sodium dithiocarbamate will probably be preferred for reasons of economy.

From these illustrations it will be seen that in the process, regardless of its particular form, the yields are substantially quantitative, that the products need only to be washed with water in order to rid them of by-products and to obtain them in pure form, and that the reactions proceed with smoothness and a high degree of efficiency. The use of complicated apparatus and technical precautions in the operation of the process is entirely avoided. These considerations, together with the low cost of the persulphate, make the process highly desirable from a commercial viewpoint.

My invention is in no way limited to the specific illustrations or to the specific steps outlined above, for numerous variations in the details of operation may be made by persons skilled in the art without departing from the spirit thereof.

It will therefore be understood that the invention embraces these and such other modifications and changes as may be desirable to adapt it to varying conditions and uses. It is intended that the patent shall cover, by suitable expression in the appended claims, whatever features of patentable novelty reside in the invention.

What I claim is:

1. A method of preparing cyclic organic disulphides which comprises oxidizing the sodium salt of a cyclic dithiocarbamate with ammonium persulphate.

2. A method of preparing cyclic thiuram disulphides which comprises oxidizing the alkali metal salt of a cyclic dithiocarbamic acid with ammonium persulphate.

3. A method of preparing disulphides of the group consisting of tetra amyl, dimethyl dicyclo hexyl, di-alpha methyl piperidyl, tetra methyl, tetra ethyl, tetra butyl, tetra benzyl, tetra beta phenyl ethyl, tetra cyclo hexyl, di-piperidyl, dibenzyl, di-alpha methyl piperidyl, di-beta phenyl ethyl and di-ethyl di-cyclo hexyl thiuram disulphides which comprises oxidizing an alkali metal salt of the corresponding dithiocarbamate with ammonium persulphate.

4. A method of preparing a piperidyl thiuram disulphide which comprises oxidizing the corresponding penta methylene dithiocarbamate with ammonium persulphate.

5. The process which comprises oxidizing an alkali metal salt of a dithiocarbamate in an aqueous alkaline medium with ammonium persulphate.

6. The process which comprises oxidizing an alkali metal salt of a hydrocarbon substituted dithiocarbamate in an aqueous alkaline medium with ammonium persulphate.

7. The process which comprises oxidizing with ammonium persulphate in an aqueous alkaline medium a salt of dimethyl dithiocarbamic acid, said salt being selected from the class consisting of alkali metal and unsubstituted ammonium salts.

8. The process which comprises oxidizing a dithiocarbamate salt with ammonium persulphate, the salt-forming radical of said dithiocarbamate salt being selected from the class consisting of the alkali metals and NH4.

9. The process of preparing tetramethyl thiuram disulphide which comprises oxidizing the sodium salt of dimethyldithiocarbamic acid with ammonium persulphate.

10. The process which comprises oxidizing a dialkyl dithiocarbamate salt with ammonium persulphate, the salt-forming radical of said dithiocarbamate being selected from the class consisting of the alkali metals and NH4.

11. The process of preparing a thiuram disulphide which comprises oxidizing a dithiocarbamate with ammonium persulphate.

12. The process of preparing a thiuram disulphide which comprises oxidizing with ammonium persulphate in an aqueous alkaline medium a water soluble salt of a dithiocarbamic acid.

13. The process of preparing a thiuram disulphide which comprises adding an aqueous solution of ammonium persulphate to an aqueous solution of a salt of a dithiocarbamic acid.

HOWARD I. CRAMER.